(12) United States Patent
Ashikhmin et al.

(10) Patent No.: US 9,100,835 B2
(45) Date of Patent: Aug. 4, 2015

(54) METHOD AND APPARATUS OF WIRELESS COMMUNICATION USING DIRECTIONAL ANTENNAS

(75) Inventors: Alexei Ashikhmin, Morristown, NJ (US); Thomas L. Marzetta, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 375 days.

(21) Appl. No.: 13/477,579

(22) Filed: May 22, 2012

(65) Prior Publication Data

US 2013/0315111 A1    Nov. 28, 2013

(51) Int. Cl.
*H04W 16/14* (2009.01)

(52) U.S. Cl.
CPC ..................... *H04W 16/14* (2013.01)

(58) Field of Classification Search
CPC . H04W 72/0446; H04W 72/04; H04W 72/08; H04W 16/10; H04W 16/14
USPC ......... 370/241, 252, 276, 277, 280, 310, 328, 370/329, 335, 336, 342, 431, 441, 464, 370/479; 455/403, 422.1, 450, 7, 24
See application file for complete search history.

(56) References Cited

U.S. PATENT DOCUMENTS

| | | | |
|---|---|---|---|
| 6,707,798 B1 | 3/2004 | Klein | |
| 2006/0221807 A1* | 10/2006 | Fukuoka et al. | 370/203 |
| 2011/0002280 A1* | 1/2011 | Davydov et al. | 370/329 |
| 2011/0176581 A1* | 7/2011 | Thomas et al. | 375/146 |
| 2011/0249597 A1 | 10/2011 | Papadopoulos | |
| 2012/0014476 A1* | 1/2012 | Kuchi et al. | 375/296 |
| 2012/0113953 A1 | 5/2012 | Papadopoulos | |

FOREIGN PATENT DOCUMENTS

WO    2009023212 A2    2/2009

OTHER PUBLICATIONS

PCT International Search Report corresponding to PCT Application No. PCT/US2013/041065 filed May 15, 2013, International Search Report issued Aug. 14, 2013, pp. 1-4.
PCT Written Opinion of the International Search Authority corresponding to PCT Application No. PCT/US2013/041065 filed May 15, 2013, International Search Report issued Aug. 14, 2013, pp. 5-12.
Jose et al., "Pilot Contamination and Precoding in Multi-Cell TDD Systems," IEEE Transactions on Wireless Communications vol. 10, No. 8, IEEE Service Center, Aug. 1, 2011, pp. 2640-2651.
(Continued)

*Primary Examiner* — Obaidul Huq
(74) *Attorney, Agent, or Firm* — Chiesa Shahinian & Giantomasi

(57) ABSTRACT

A method is provided, in which a base station allocates pilot signals to mobile terminals in a cell, obtains CSI from uplink pilot signals transmitted by mobile terminals, uses the CSI to precode messages, and transmits the messages in conformance with a TDD protocol. The CSI is obtained by comparing the pilot signal received from each mobile terminal to a known pilot signal associated with that mobile terminal. The known pilot signals are associated with respective mobile terminals according to a pilot signal reuse pattern in which adjacent cells are allocated mutually orthogonal reuse groups of mutually orthogonal pilot signals, and mobile terminals within a given cell are limited to transmitting only pilot signals allocated to that cell.

13 Claims, 8 Drawing Sheets

(56) References Cited

OTHER PUBLICATIONS

T. L. Marzetta, "Noncooperative Cellular Wireless with Unlimited Numbers of Base Station Antennas," IEEE Transactions on Wireless Communications, vol. 9, Nov. 2010, pp. 3590-3600.

Jose et al., "Pilot Contamination Problem in Multi-Cell TDD Systems," Proc. Int. SVMP. On Information Theory, 2009, pp. 2184-1288.

T. L. Marzetta, "How Much Training is Required for Multiuser MIMO's?," Proceedings of Asilomar Conference on Signals, Systems, and Computers, 2006, pp. 359-363.

* cited by examiner

FIG. 7

| A | B | D | C | A | B |
|---|---|---|---|---|---|
| B | A | C | D | B | A |
| C | D | B | A | C | D |
| D | C | A | B | D | C |
| A | B | D | C | A | B |
| B | A | C | D | B | A |

METHOD AND APPARATUS OF WIRELESS COMMUNICATION USING DIRECTIONAL ANTENNAS

FIELD OF THE INVENTION

The invention relates to methods and systems of wireless communication that use TDD transmission.

ART BACKGROUND

It has long been known that techniques of spatial multiplexing can be used to improve the spectral efficiency of wireless networks. (Spectral efficiency describes the transmitted data rate per unit of frequency, typically in bits per second per Hz.) In typical examples of spatial multiplexing, a multiple array of transmit antennas sends a superposition of messages to a multiple array of receive antennas. The channel state information (CSI), i.e. the channel coefficients between the respective transmit-receive antenna pairs, is assumed known. Provided that there is low correlation among the respective channel coefficients, the CSI can be used by the transmitter, or the receiver, or both, to define a quasi-independent channel for each of the transmitted messages. As a consequence, the individual messages are recoverable at the receiving antenna array.

More recently, experts have proposed extensions of the spatial multiplexing technique, in which a multiplicity of mobile or stationary user terminals (also referred to herein as "terminals") are served simultaneously in the same time-frequency slots by an even larger number of base station antennas or the like, which we refer to herein as "service antennas", or simply as "antennas". Particularly when the number of service antennas is much greater than the number of terminals, such networks may be referred to as "Large-Scale Antenna Systems (LSAS)".

Theoretical studies predict that the performance of LSAS networks scales favorably with increasing numbers of service antennas. In particular, there are gains not only in the spectral efficiency, but also in the energy efficiency. (The energy efficiency describes the ratio of total data throughput to total transmitted power, and is measured, e.g., in bits per Joule.)

One such study is T. L. Marzetta, "Noncooperative Cellular Wireless with Unlimited Numbers of Base Station Antennas," *IEEE Trans. on Wireless Communications* 9 (November 2010) 3590-3600, hereinafter referred to as "Marzetta 2010".

In some approaches, the base stations may obtain CSI through a procedure that relies on time-division duplex (TDD) reciprocity. That is, terminals send pilot sequences on the reverse link, from which the base stations can estimate the CSI. The base stations can then use the CSI for beam forming. This approach works well when each terminal can be assigned one of a set of mutually orthogonal pilot sequences.

Generally, it is considered advantageous for the mobiles to synchronously transmit all pilot sequences on a given frequency, and possibly even on all frequencies, making use of the mutual orthogonality of the pilot sequences.

The number of available orthogonal pilot sequences, however, is relatively small, and can be no more than the ratio of the coherence time to the delay spread. Terminals within a single cell can use orthogonal pilot sequences, but terminals from the neighboring cells will typically be required to reuse at least some of the same pilot sequences. This reuse of pilot sequences in different cells creates the problem of pilot contamination. The pilot contamination causes a base station to beam-form its message-bearing signals not only to the terminals located in the same cell, but also to terminals located in the neighboring cells. This is so-called directed interference. The directed interference does not vanish as the number of base station antennas grows larger. In fact, the directed intercell interference—along with the desired signals—grows in proportion to the number of base station antennas.

As shown in Marzetta 2010, for example, as the number of base station antennas grows in an LSAS network, intercell interference arising from pilot contamination will eventually emerge as the dominant source of interference.

A method for mitigating directed interference in LSAS networks, using precoding of downlink signals, is described in the co-pending U.S. patent application Ser. No. 13/329,834, filed on Dec. 19, 2011 by A. Ashikhmin and T. Marzetta under the title, "Large-Scale Antenna Method and Apparatus of Wireless Communication with Suppression of Intercell Interference," and assigned to the assignee hereof.

However, there remains a need for further approaches that can mitigate the problem of directed interference due to pilot contamination in LSAS networks as well as in wireless networks that employ small antenna arrays, or even single antennas, at each base station.

SUMMARY OF THE INVENTION

We have found such an approach. In one embodiment, we have provided a new method in which a base station allocates pilot signals to mobile terminals in a cell, obtains CSI from uplink pilot signals transmitted by mobile terminals, uses the CSI to precode messages, and transmits the messages in conformance with a TDD protocol. The CSI is obtained by comparing the pilot signal received from each mobile terminal to a known pilot signal associated with that mobile terminal. The known pilot signals are associated with respective mobile terminals according to a pilot signal reuse pattern in which adjacent cells are allocated mutually orthogonal reuse groups of mutually orthogonal pilot signals, and mobile terminals within a given cell are limited to transmitting only pilot signals allocated to that cell.

BRIEF DESCRIPTION OF THE DRAWINGS

FIG. 7 is a schematic drawing of a reuse pattern for pilot signals in which each cell has four sectors.

DETAILED DESCRIPTION

Figure 1:
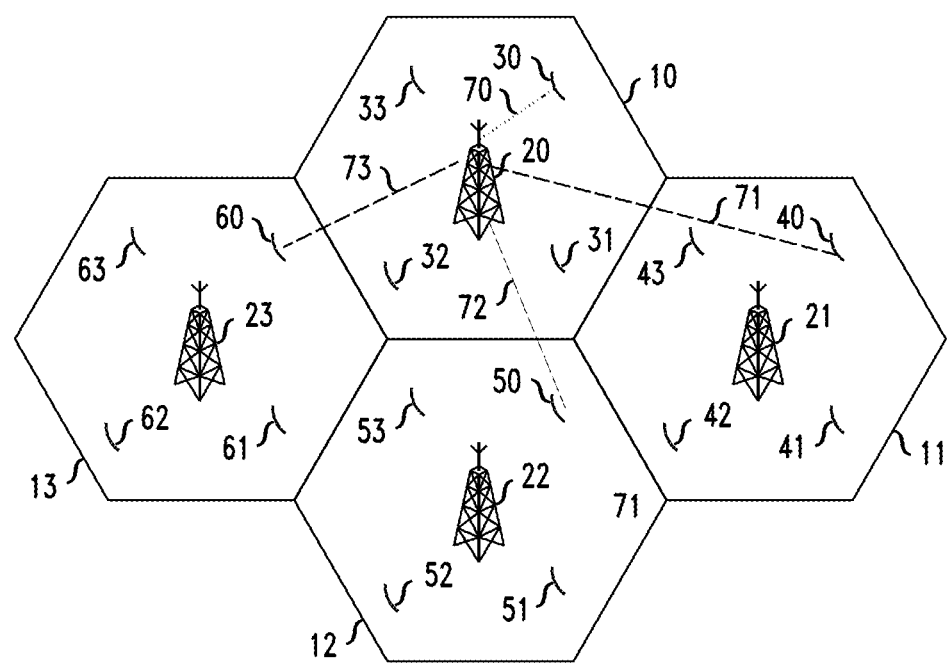
FIG. 1 is a schematic drawing of a portion of an LSAS network, illustrating intercell interference due to pilot contamination.

In the following discussion, the term "message" means the whole or any portion of a body of data to be transmitted. A message may be encoded in the form of one or more symbols, each symbol having an information content of one or more binary bits. The term "module" means any specialized circuit or combination of circuits, or any set of instructions recorded in a machine-readable memory, together with general-purpose or special-purpose circuitry capable of carrying out the recorded instructions.

A message-carrying signal transmitted from a base station antenna array during one channel use interval is referred to here as a "symbol". A symbol may be distributed in both space and frequency, because each base station may have multiple antennas for transmission, and each symbol may be distributed over multiple OFDM subcarriers or "tones".

The term "antenna" refers to a base station antenna associated with a cell. Each cell has at most M antennas. The term "terminal" refers to a mobile user terminal.

We use the terms "pilot signal" and "pilot sequence" interchangeably, unless otherwise noted.

In an illustrative scenario, a network has a total number L of cells. For convenience, we assume that each cell contains n users. The total number of pilot signals used in the network is K≥n. The pilot signals are numbered 1, ..., K. Users in a given cell transmit orthogonal pilot signals $v_k$, k=1, ..., n. In our formalism, the pilot signals are represented as row vectors. Each row vector represents a sequence of complex baseband signal values. In implementations, the sequence is a time sequence. In other implementations, the sequence may e.g. be a sequence over both time and frequency. That is, the elements of the sequence may be transmitted in time and frequency bins. By "orthogonal" is meant that given two pilot signals $v_r$, $v_j$, the product $v_r \cdot v_j^*$ equals zero if r≠j. In our notation, the vector v* is the conjugate transpose of the vector v, and operation represented by the symbol "•" is the vector dot product.

For the present illustration, we will assume that the same pilot signals are reused in all cells, and that they are allocated to terminals such that in each cell, the k-th terminal is allocated pilot signal k. Later, we will describe scenarios in which different cells are allocated different groups of pilot signals.

In our notation, antenna mi is the m-th antenna of cell i. Terminal kl is the k-th terminal of cell l.

For tone τ, the channel coefficient between antenna mi and terminal kl is $g_{\tau mikl} = h_{\tau mikl} \cdot \beta_{ikl}^{1/2}$, where the first product term is the channel coefficient for fast fading and the second product term is the slow-fading coefficient. Hereinafter, the tone index τ will be suppressed from our notation. Accordingly, if the k-th user terminal in the l-th cell transmits a signal s, we represent the corresponding signal received over its array of M antennas by the i-th base station as $\beta_{ikl}^{1/2} h_{ikl} s$, where $g_{ikl} = \beta_{ikl}^{1/2} h_{ikl} = \beta_{ikl}^{1/2} (h_{1ikl}, h_{2ikl}, \ldots, h_{Mikl})^T$ is the complex-valued channel vector, and in our notation, $h^T$ is the transpose of vector h.

The fast-fading coefficients generally exhibit rapid variation over space and time. In particular, they can change with as little as ¼ wavelength of motion by the user terminals. The fast-fading coefficients typically vary over frequency intervals that are the reciprocal of the channel delay spread.

By contrast, the slow-fading coefficients, which are generally due to a combination of geometric attenuation and shadow fading, are approximately constant over relevant frequency ranges, and they vary slowly over space and time. By contrast, fast fading typically changes rapidly over space and time.

Accordingly, the coefficients $h_{mikl}$ are advantageously estimated each time the mobile terminals transmit their pilot signals, e.g. by obtaining the coefficients $g_{\tau mikl}$ from the pilot signals and inferring the coefficients $h_{mikl}$ from known values of the coefficients $\beta_{ikl}^{1/2}$. A separate procedure may be used for updating the coefficients $\beta_{ikl}^{1/2}$ using, e.g., specially designed pilot signals that are transmitted less frequently than those used to update the coefficients $h_{mikl}$.

FIG. 1 shows a portion of a cellular network, including cells 10-13, having respective base stations 20-23. A plurality of mobile terminals is shown in each cell, respectively labeled 30-33, 40-43, 50-53, and 60-63. To simplify the drawing, each of the base stations is treated as having only a single antenna.

In forward-link transmission, base station 20, for example, transmits a message to terminal 30 on path 70. If terminals 40, 50, and 60 have been assigned the same pilot signal as terminal 30, pilot contamination may cause the transmitted message to interfere on paths 71, 72, and 73 to terminals 40, 50, and 60, respectively.

Conversely, in reverse-link transmission, terminal 30 transmits a message to base station 20 on path 70. (For purposes of this illustration, we are treating paths 70-73 as bidirectional.) Pilot contamination may cause the reverse-link messages on paths 71-73 to interfere, at base station 20, with the reverse-link message transmitted from terminal 30 on path 70. Pilot contamination is discussed in further detail below.

Figure 2:
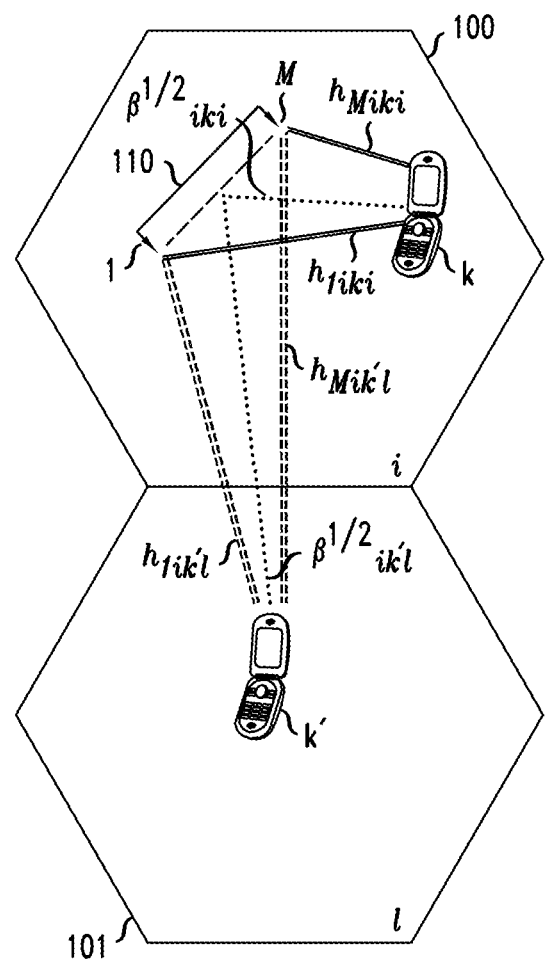
FIG. 2 is a schematic drawing of a portion of an LSAS network, illustrating a distinction between fast-fading coefficients and slow-fading coefficients.

FIG. 2 shows a portion of a cellular network, including cells 100 and 101. To illustrate what is meant by fast-fading and slow-fading coefficients, we have included, in the figure, base station antenna array 110 of cell 100, mobile terminal k of cell 100, and mobile terminal k' of cell 101. To simplify the figure, all other features of the cells have been omitted. As indicated in the figure, cell 100 is cell i for purposes of this illustration, and cell 101 is cell l. Antenna array 110 includes M antennas, of which antenna 1 and antenna M have been explicitly shown. Although antenna array 110 has been drawn for convenience as a linear array, it should be noted that there is no requirement for the geographical distribution of antennas to take a linear shape, or any other particular shape. Likewise, the scale of the linear antenna array has been drawn, solely for convenience, as comparable to the size of the cell. There is no limitation on the geographical scale of the antenna array, except that it will generally be advantageous to space the antennas apart by at least one-half wavelength to minimize the electromagnetic coupling between antennas.

Turning to the figure, it will be seen that propagation paths from antenna 1 to terminal k, antenna 1 to terminal k', antenna M to terminal k, and antenna M to terminal k' have been respectively labeled with the fast-fading coefficients $h_{1iki}$, $h_{1ikl}$, $h_{Miki}$, and $h_{Mikl}$. Two slow-fading coefficients have also been indicated in the figure. They are $\beta_{iki}^{1/2}$ from array 110 to terminal k of cell i, and $\beta_{ikl}^{1/2}$ from antenna array 110 to terminal k' of cell l. Other fast-fading coefficients from intermediate antennas of array 110 to the respective terminals are indicated only by broken lines in the figure.

An illustrative network may use OFDM signal modulation for both forward link and reverse link signals. It should be understood, however, that the invention is not limited to OFDM, but may be implemented using other modulation techniques such as Single-Carrier FDMA, time-reversal modulation or CDMA modulation.

The number M of antennas per base station may take any value from 1 to several hundred or even more. However, fewer than 20 omnidirectional antennas, or fewer than 20 directional antennas per sector, might be insufficient to realize the full benefits of a type of signal averaging that will be described below. On the other hand, more than 1000 antennas per base station, although advantageous for optimizing performance, might be impractical due to limitations of space and cost.

In a time-division duplex (TDD) network, the base station can estimate the channel coefficients from the pilot signals that it receives from the user terminals in its own cell. The base station can use the estimated channel coefficients to precode downlink signals before it transmits them to the user terminals. One use for precoding in base stations equipped with multi-antenna arrays is to beamform the downlink signals, so that the energy in a transmission destined for a particular user is preferentially directed toward that user.

More specifically, the l-th base station receives a sum of the concurrently transmitted pilot signals $v_k$, k=1, ..., n from its own served user terminals and uses them to form the estimates $\hat{g}_{lkl}$, k=1, ..., n, of the corresponding channel vectors to the respective users by comparing them with known values of the pilot signals. Because the pilot signals $v_k$, k=1, ..., n, from within the one given cell are mutually orthogonal they do not contaminate each other and hence, the base station is able to obtain estimates that are unbiased with respect to the user terminals within its own cell. If those were the only pilot signals transmitted at a given time within the entire network, the estimates would also be unbiased with respect to the user terminals of other cells.

The l-th base station uses the estimates $\hat{g}_{lkl}$, k=1, ..., n, to transmit precoded messages simultaneously to all n of its served user terminals such that the message addressed to a terminal r does not interfere with a message addressed to a different terminal j. One precoding method useful in this regard is zero-forcing precoding, as described, for example, in T. L. Marzetta, "How much training is required for multiuser MIMO?," *Proceedings of Asilomar Conference on Signals, Systems, and Computers*, (2006) 359-363 (hereinafter, Marzetta 2006). Thus intra-cell interference may be avoided.

In typical scenarios, pilot signals are transmitted concurrently from user terminals in all cells of the network. As noted above, there are practical reasons why it is not generally feasible for different cells to use different, mutually orthogonal sets of pilot signals. Consequently, as explained in more detail below, channel estimates obtained by the base station of a given cell will generally be biased with respect to the user terminals of other cells. We refer to such bias as "pilot contamination".

Previous work, as reported for example in Marzetta 2010, shows that when the number M of antennas becomes very large, the network performance is substantially free of degradation due to additive noise. There remains, however, one major obstacle to further increase in the data transmission rate. That obstacle is intercell interference caused by pilot contamination.

A more detailed understanding of pilot contamination is gained by considering an illustrative network in which the same set of pilot signals is reused in all cells, so that if the k-th user terminal in cell 1 uses pilot signal $v_k$, then in the neighboring cell 2 as well as in every other cell, there is also a user terminal k that uses the same pilot signal $v_k$.

Figure 3:
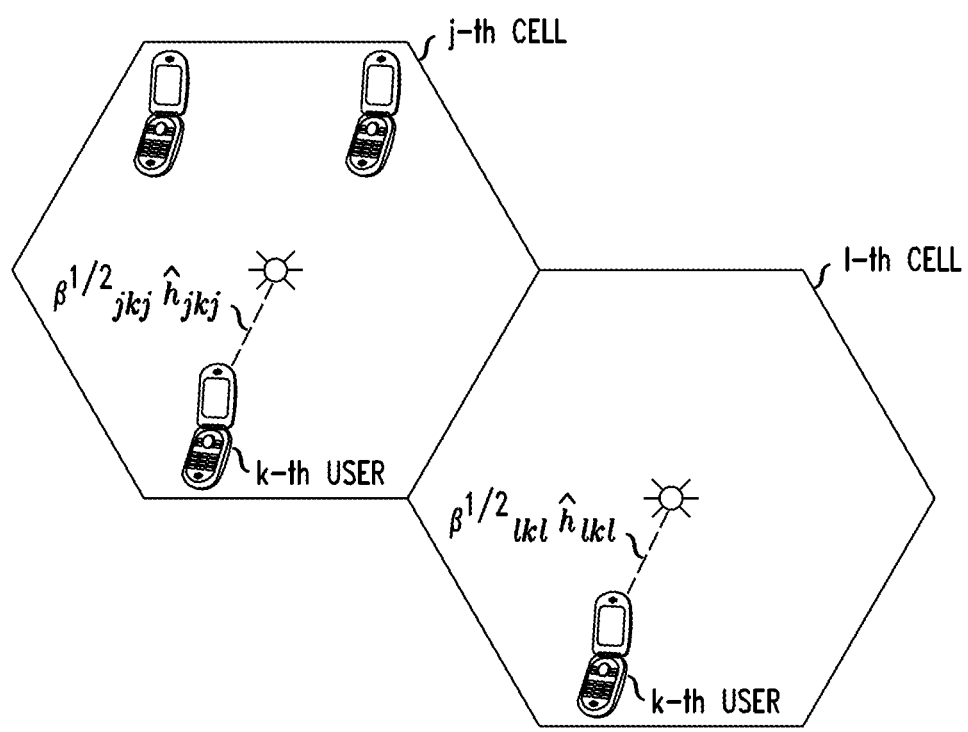
FIG. 3 is a schematic drawing of a portion of an LSAS network, illustrating the propagation channel for intracell transmission and reception.
Figure 4:
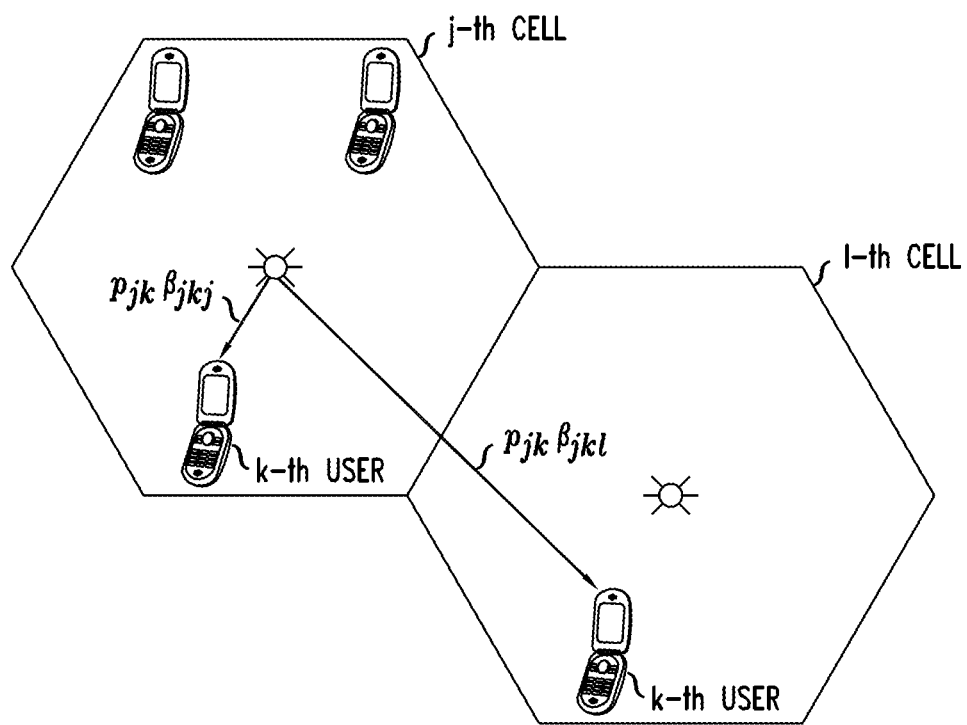
FIG. 4 is a schematic drawing of the network portion of FIG. 3, illustrating the propagation channel for intercell transmission and reception, leading to interference.

With specific reference to cell j and cell 1 of FIG. 3, the reuse of pilot signal $v_k$ causes the estimates $\beta_{jkj}^{1/2}\hat{h}_{jkj}$ and $\beta_{lkl}^{1/2}\hat{h}_{lkl}$ to be biased to each other. Because of this contamination, the signal from base station j (i.e., the base station of cell j) to terminal k of cell j creates strong interference 400 to terminal k of cell l, as illustrated in FIG. 4. Similarly the signal from base station l (i.e., the base station of cell l) to terminal k of cell l creates strong interference 400 to terminal k of cell j. Detailed analysis of this phenomenon may be found, for example, in Marzetta 2010 and in J. Jose et al., "Pilot contamination problem in multi-cell TDD systems," *Proc. Int. Symp. on Information Theory* (2009) 2184-2188 (hereinafter, Jose 2009).

As noted above, we denote by $\beta_{jkl}^{1/2}$ the slow-fading coefficient between the j-th base station and the k-th terminal of the l-th cell. We now denote by $p_{jk}$ the power with which the j-th base station transmits to the k-th terminal of the j-th cell.

It is shown in Marzetta 2010 that as the number M of base station antennas tends to infinity, the j-th base station creates interference $p_{jk}\beta_{jkl}$ to the k-th terminal of the l-th cell, as indicated in FIG. 4. As a consequence, the Signal-to-Interference Ratio (SIR) of the k-th terminal of the l-th cell is $$SIR_{lk} = \frac{p_{lk}\beta_{lkl}^2}{\sum_{j=1, j \neq l}^{L} p_{jk}\beta_{jkl}^2}, \tag{1}$$

where the summation in the denominator is taken over all cells of the network except for cell l.

Simulations show that for typical values of the slow-fading coefficients and for equal transmit powers (i.e., $p_{lk}$=p for all l, k), and assuming a bandwidth of 20 MHz, $SIR_{lk}$ for 95% of the users will be greater than −29 dB. For the data transmission rates, this means that 95% of the users can be served with data transmission rates $$R_{95\%} > 0.016 \text{ Mbit/s.} \tag{2}$$

If the intercell interference rates could be reduced further, still greater data transmission rates could be provided. One known method that can reduce the intercell interference is frequency reuse. For example, in a frequency reuse scheme having a reuse factor of 3, the available frequency band is partitioned into 3 sub-bands respectively labeled as sub-bands of types A, B, and C. The cells are also partitioned into three corresponding types in a geographical pattern defined so that no cell has any nearest neighbor cell of the same type. Each cell uses only the frequency sub-band of its own type for transmission. Accordingly, cells of different types will operate on mutually orthogonal frequency bands and so will not interfere with each other. Cells of the same type may potentially interfere with each other, but the interfering energy will be attenuated due to geographical separation between interfering cells.

Although they have some advantages, frequency reuse schemes also have a significant cost. That is, because each base station is permitted to transmit only in a sub-band, the downlink transmissions, including those for data downloads, are limited to a fraction of the full bandwidth that would otherwise be available. As a consequence of the limited bandwidth, the maximum possible data-transmission rate on the downlink is similarly limited.

Our new solution is to reuse pilot signals instead of, or in addition to, reusing frequencies. As above, the cells are partitioned into various types in a geographical pattern defined so that no cell has any nearest neighbor cell of the same type; i.e., so that adjacent cells are always of different types. A set of pilot signals is likewise partitioned, and each cell is allocated only the pilot signals of its own type. Pilot contamination can now take place only between cells of the same type. Because such cells are geographically separated, the amount of pilot contamination is reduced.

One possible objection to such a pilot reuse scheme is that because each cell is allocated only a fraction of the full number of pilot signals, the total number of user terminals that the cell can support is likewise reduced.

Our solution to that problem calls for subdividing each cell into four or more sectors, and for using directional antenna arrays to concentrate downlink transmission energy and uplink receptive sensitivity within corresponding sectors. Thus, downlink transmissions are directed preferentially into selected sectors, and uplink transmissions are preferentially received from each sector via a corresponding antenna arrays. As used herein, the term "antenna array" means one or more antennas operated together in a coordinated manner.

In a cell that has been sectorized as described above, pilot signals can be conserved by reusing them among the population of user terminals within the same cell. That is, use of the same pilot signal by two user terminals occupying different sectors will not cause interference if the antenna arrays serving the respective sectors are sufficiently directional to substantially eliminate the possibility of crosstalk between the sectors.

Although this might be difficult to achieve for adjacent sectors, we believe that it will often be within the capabilities of current technology to achieve this for sectors that are nonadjacent.

Figure 5:
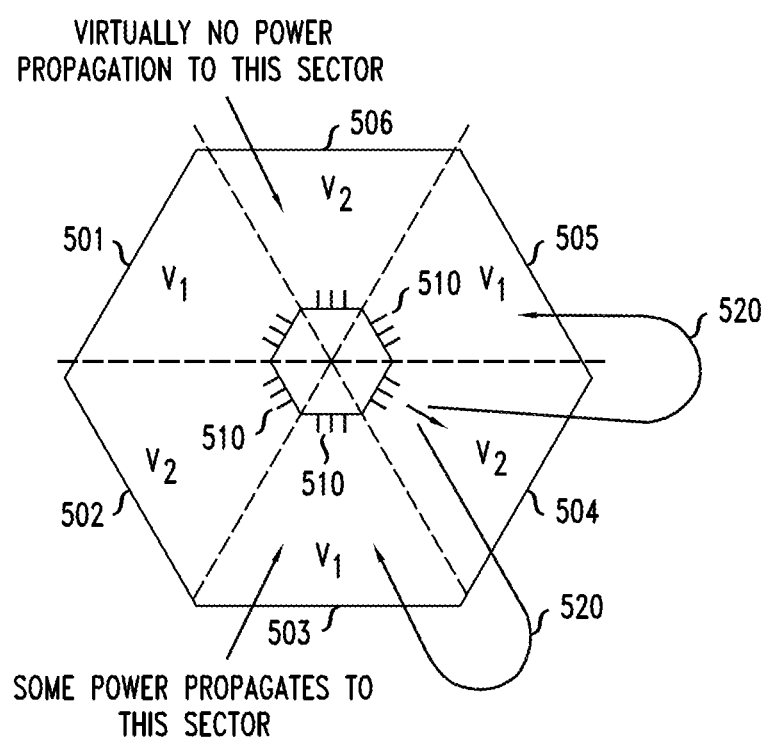
FIG. 5 is a schematic drawing of a cell of an LSAS network that has been sectorized according to an embodiment as described herein.

By way of example, FIG. 5 shows a partition of a cell into six sectors 501-506 of 60° each. Each sector is served by an array 510 of directional antennas. (A directional "antenna" may be, without limitation, a single antenna or a directional sub-array of antennas, individual elements of which may or may not be directional.) Illustratively, we have shown an array of three directional antennas in each sector. In general, if the total number of directional antennas for the cell is M, then the number of directional antennas in each sector will be M/6.

With further reference to the example of FIG. 5, a full set of pilot signals consists of the mutually orthogonal 6-tuples $v_1$, $v_2$, $v_3$, $v_4$, $v_5$, $v_6$. Under the simplifying assumption that only one user terminal needs to be served at a given time within each sector, we allocate the pilot signal $v_1$ to three of the sectors of the cell, and the pilot signal $v_2$ to the other three sectors, as shown in the figure. Some significant overlap is possible between adjacent sectors due to incomplete directionality of the antenna arrays, as illustrated by arrows 520 in FIG. 5. However, we believe that a high degree of isolation is possible between nonadjacent sectors. Accordingly, the alternation of sectors in this example between pilots $v_1$ and $v_2$ will prevent intracell interference even though only two pilot signals are used for the entire cell.

Figure 6:
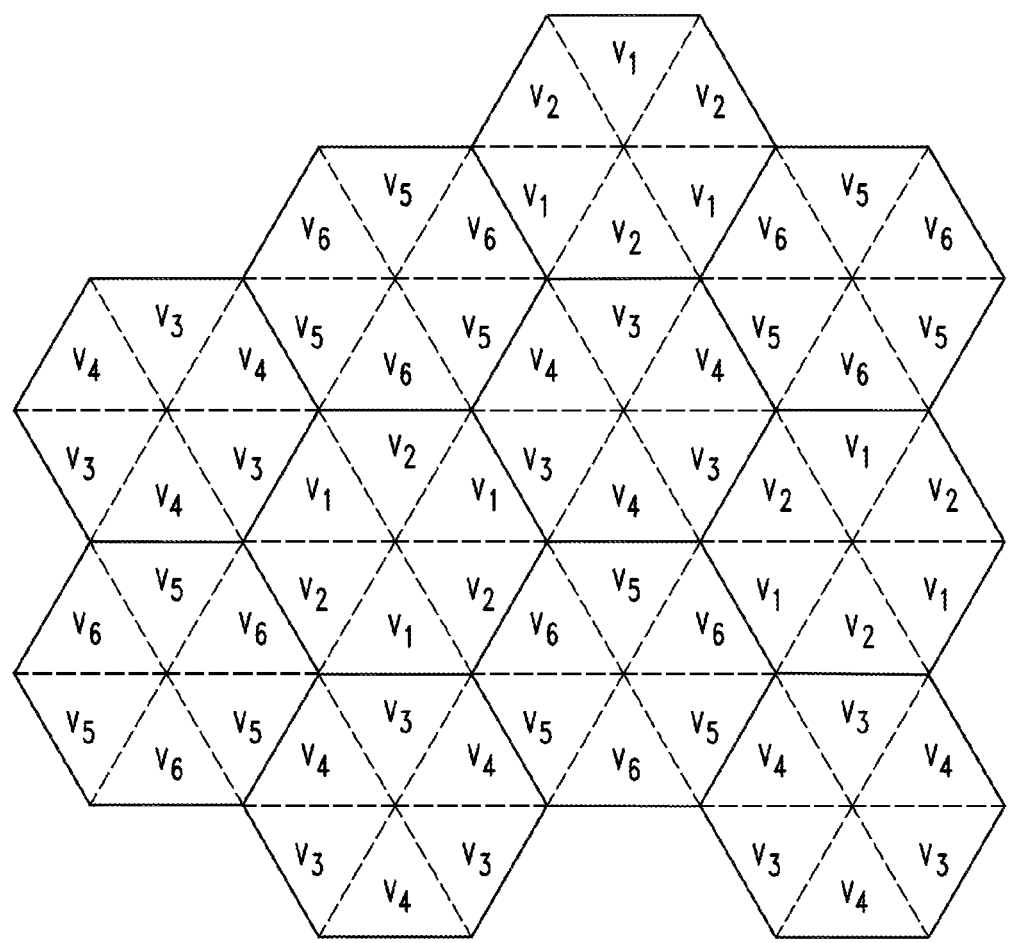
FIG. 6 is a schematic drawing of a reuse pattern for pilot signals in which each cell has six sectors.

Continuing with the same example, we now turn to FIG. 6, which illustrates a partition of the cells of a network into three respective types A, B, and C. Cells of type A are allocated pilot signals $v_1$, $v_2$; cells of type B, $v_3$, $v_4$; and cells of type C, $v_5$, $v_6$. As in the frequency reuse patterns discussed above, the partition is made in a geographical pattern defined so that no cell has any nearest neighbor cell of the same type, i.e., so that no adjacent pair of cells have the same type. We use the term "pilot reuse group" to refer to the set of pilot signals allocated to cells of a particular type.

It will be seen that in the pilot-signal allocation pattern of FIG. 6, pilot signals will cause interference only between cells of the same type. Because such cells are geographically separated from each other, the resulting pilot contamination will be substantially reduced.

In the limit as the number of antennas per cell tends to infinity, the SIR of the k-th terminal of the l-th cell in our pilot-reuse scheme will be $$SIR_{lk} = \frac{p_{lk}\beta_{lkl}^2}{\sum_{\substack{j \neq l \\ j \text{ is of the} \\ \text{same type as } l}} p_{jk}\beta_{jkl}^2}, \quad (3)$$

where the summation in the denominator differs from Equation (1) because, now, it is taken only over the potentially interfering cells, that is, only over the cells that are the same type (i.e., that belong to the same pilot reuse class) as the l-th cell.

Simulations show that for typical values of the slow-fading coefficients and for equal transmit powers (i.e., $p_{lk}=p$ for all l, k), $SIR_{lk}$ for 95% of the users will be greater than −5.8 dB. For the data transmission rates, assuming a bandwidth of 20 MHz, this means that 95% of the users can be served with data transmission rates $$R_{95\%} > 2.67 \text{ Mbit/s}. \quad (4)$$

Comparison between Equations (2) and (4) predicts that our pilot reuse scheme can lead to an improvement in data rate of approximately 166-fold over a conventional, omnidirectional TDD system.

In FIG. 5, we have provided a simplified example in which only one pilot signal is allocated to each sector of each cell. As those skilled in the art will readily appreciate, multiple pilot signals can likewise be allocated to each sector, provided that the pilot signals allocated to each sector are orthogonal to the pilot signals allocated to adjacent sectors of the cell. Stated differently, the reuse group allocated to a given cell is partitioned into subgroups of two or more different types, and the cell is divided into sectors of two or more corresponding types. Each subgroup of pilot signals is allocated only to sectors of its own type.

It will be appreciated that in the example of FIG. 6, each cell is divided into six sectors, and the network has a reuse factor of 3 because there are three types (i.e., reuse classes) of cells that use different sets of pilot signals. More generally, cells may be divided into as few as four sectors (for example when the cells are nominally square), and the reuse factor may be as low as 2, as shown in the exemplary checkerboard pattern of FIG. 7.

On the other hand, the number of sectors may be as high as eight, or even more. It should be noted in this regard that if the number of users occupying a given sector is greater than the number of pilot signals allocated to that sector, users might share the same pilot signal by transmitting it in orthogonal timeslots. However, if there are very many users per shared pilot signal, timesharing of that kind can lead to long service delays. Such a problem can be mitigated by increasing the number of sectors, so that there are fewer users, hence less demand for shared pilot signals, per sector.

One possible drawback of high sectorization, i.e., of dividing cells into eight, ten, or more sectors, is that if the total number of antennas deployed at the base station is fixed, then the higher the sectorization, the fewer antennas there are per sector. As noted above, the analysis of Marzetta 2010 shows that as the number of base station antennas tends to infinity, intercell interference arising from pilot contamination tends to dominate as interference from other sources tends to fall away, and it tends to a value dependent on slow-fading coefficients but not on fast-fading coefficients. Because these favorable tendencies are the result of averaging over large antenna arrays, we expect their benefits for interference reduction to weaken rapidly as the number of antennas per sector is reduced.

Figure 8:
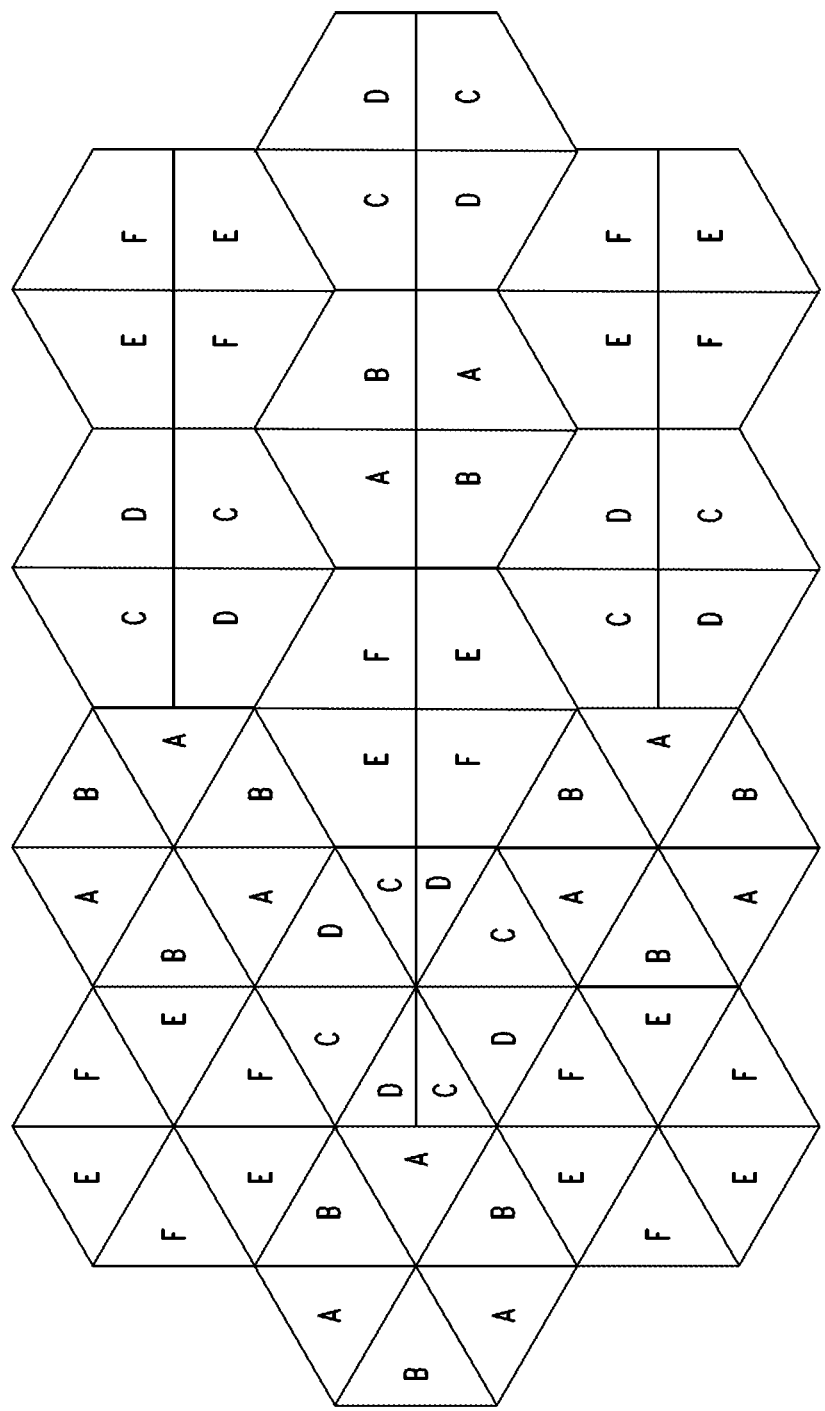
FIG. 8 is a schematic drawing of a locally sectorized reuse pattern for pilot signals in which the cells have variable numbers of sectors.

Because such tradeoffs apply when choosing the degree of sectorization, it may be advantageous to configure some networks with local sectorization; i.e., with a degree of sectorization that varies over the network. For example, FIG. 8 schematically shows a hypothetical network in which cells may have four, six, or eight sectors. As seen in the figure, there are three pilot reuse classes, consisting respectively of the pilot sub-groups A and B, C and D, and E and F.

Some cells may be configurable for variable degrees of sectorization. This may be achieved, for example, by varying the configuration of the base station antennas. Such cells offer the possibility of selecting a sectorization that optimizes the tradeoff between performance gain due to increasing the number of sectors and performance loss due to dividing a fixed number of antennas over a greater number of sectors.

What is claimed is:

1. A method performed by a base station serving a cell, comprising:
   allocating pilot signals to mobile terminals in the cell, wherein a same pilot signal is allocated to different sectors of the cell;
   obtaining channel state information (CSI) from uplink pilot signals transmitted by mobile terminals;
   using the CSI to precode messages; and
   transmitting the messages in conformance with a TDD protocol;
   wherein:
     the CSI is obtained by comparing the pilot signal received from each mobile terminal to a known pilot signal associated with that mobile terminal; and
     the known pilot signals are associated with respective mobile terminals according to a pilot signal reuse pattern in which adjacent cells are allocated mutually orthogonal reuse groups of mutually orthogonal pilot signals, and mobile terminals within a given cell are limited to transmitting only pilot signals allocated to that cell;
   and further wherein:
     the served cell has an allocated reuse group;
     the served cell is divided into at least four sectors of designated types, such that there are at least two sector types and adjacent sectors must have different types;
     the allocated reuse group is partitioned into two or more subgroups corresponding to the respective sector types; and
     the step of allocating pilot signals to mobile terminals in the served cell is performed such that mobile terminals within a sector of each type will transmit only pilot signals of that type.

2. The method of claim 1, wherein the step of allocating pilot signals to mobile terminals in the served cell is performed such that mobile terminals within a sector of each type are allocated only pilot signals of that type.

3. The method of claim 2, further comprising:
   detecting when a mobile terminal has entered a new sector of the same cell, and
   in response to said detection, allocating pilot signals of a different type to the mobile terminal.

4. The method of claim 1, wherein the step of allocating pilot signals to mobile terminals in the served cell is performed such that mobile terminals within each sector are allocated pilot signals of two or more types, and the method further comprises limiting the mobile terminals occupying each sector of a given type to transmitting only pilot signals of that type.

5. The method of claim 1, wherein the precoded messages are transmitted into selected sectors using directional antennas, and wherein the method further comprises receiving the uplink pilot signals on the directional antennas.

6. The method of claim 1, wherein the base station is part of a network having a reuse factor of 3 or more, and wherein the base station has an allocated reuse group that is one of three mutually orthogonal reuse groups of pilot signals.

7. The method of claim 6, wherein:
   the served cell is divided into six sectors;
   each sector is assigned to one of two types;
   the allocated reuse group of the base station is partitioned into two subgroups, each of which corresponds to one of the two respective sector types; and
   the step of allocating pilot signals to mobile terminals in the served cell is performed such that mobile terminals within a sector of each type will transmit only pilot signals of that type.

8. The method of claim 1, wherein:
   the precoded messages are transmitted into selected sectors using directional antennas;
   the method further comprises receiving the uplink pilot signals on the directional antennas;
   the base station has a total number M of antennas that are divided among a number S of the at least four sectors; and
   the number S of the at least four sectors is selected to achieve a favorable tradeoff between performance gain due to increasing S and performance loss due to decreasing the number of antennas per sector.

9. Base station apparatus for serving a cell of a wireless network, comprising:
   a digital memory device operable to maintain a list of mutually orthogonal pilot signals that belong to an allocated reuse group, wherein the allocated reuse group is one of two or more pilot-signal reuse groups that are assigned to cells of the network according to a pilot signal reuse pattern in which adjacent cells are assigned mutually orthogonal reuse groups of mutually orthogonal pilot signals;
   a pilot module operable to obtain pilot signals of the allocated reuse group from the digital memory device and to assign them to mobile terminals in the cell such that a same pilot signal is allocated to different sectors of the cell;
   radio receiver apparatus configured to receive pilot signals of the allocated reuse group from said mobile terminals and to obtain channel state information (CSI) from the received pilot signals by comparing the pilot signal received from each mobile terminal to a known pilot signal associated with that mobile terminal;
   a signal processor configured to obtain the CSI from the radio receiver apparatus and to use the CSI to precode messages; and
   radio transmitter apparatus configured to receive the precoded messages from the signal processor and to transmit the precoded messages in conformance with a TDD protocol,
   wherein:
     the base station apparatus is configured to serve the sectors of a cell divided into at least four sectors, each having a specified type; and
     the pilot module is configured to assign the pilot signals subject to a limitation that mobile terminals within a sector of each type may transmit only pilot signals of a corresponding type, wherein:
       there are at least two sector types;
       adjacent sectors must have different types; and the pilot signals in the allocated reuse group are partitioned into two or more subgroups corresponding to the respective sector types.

10. The base station apparatus of claim 9, wherein the radio transmitter apparatus is configured to transmit the precoded messages into selected sectors using directional antennas, and the radio receiver apparatus is configured to receive the pilot signals from the mobile terminals of selected sectors using the directional antennas.

11. The base station apparatus of claim 9, wherein:
the base station apparatus further comprises a total number M of antennas divided among a number S of the at least four sectors, wherein the M antennas are communicatively coupled to the radio transmitter and radio receiver apparatus; and
the number S of the at least four sectors is selectable to achieve a favorable tradeoff between performance gain due to increasing S and performance loss due to decreasing the number of antennas per sector.

12. A method performed by a base station serving a cell, comprising:
allocating pilot signals to mobile terminals in the cell, wherein a same pilot signal is allocated to different sectors of the cell;
obtaining channel state information (CSI) from uplink pilot signals transmitted by mobile terminals;
using the CSI to precode messages; and
transmitting the messages in conformance with a TDD protocol; wherein:
the CSI is obtained by comparing the pilot signal received from each mobile terminal to a known pilot signal associated with that mobile terminal;
the known pilot signals are associated with respective mobile terminals according to a pilot signal reuse pattern in which at least two different classes of cells are allocated different, mutually orthogonal reuse groups of mutually orthogonal pilot signals, and mobile terminals within a given cell are limited to transmitting only pilot signals allocated to that cell,
wherein:
the served cell has an allocated reuse group;
the served cell is divided into at least four sectors of designated types, such that there are at least two sector types and adjacent sectors must have different types;
the allocated reuse group is partitioned into two or more subgroups corresponding to the respective sector types; and
the step of allocating pilot signals to mobile terminals in the served cell is performed such that mobile terminals within a sector of each type will transmit only pilot signals of that type.

13. The method of claim 12, wherein:
the pilot signals in each reuse group are allocated to specific sectors of their respective cells; and
the allocation of reuse groups to cells and of pilot signals to sectors is performed such that the pilot signals allocated to any sector must all be orthogonal to the pilot signals allocated to an adjacent sector within the same cell or within an adjacent cell.

* * * * *